UNITED STATES PATENT OFFICE.

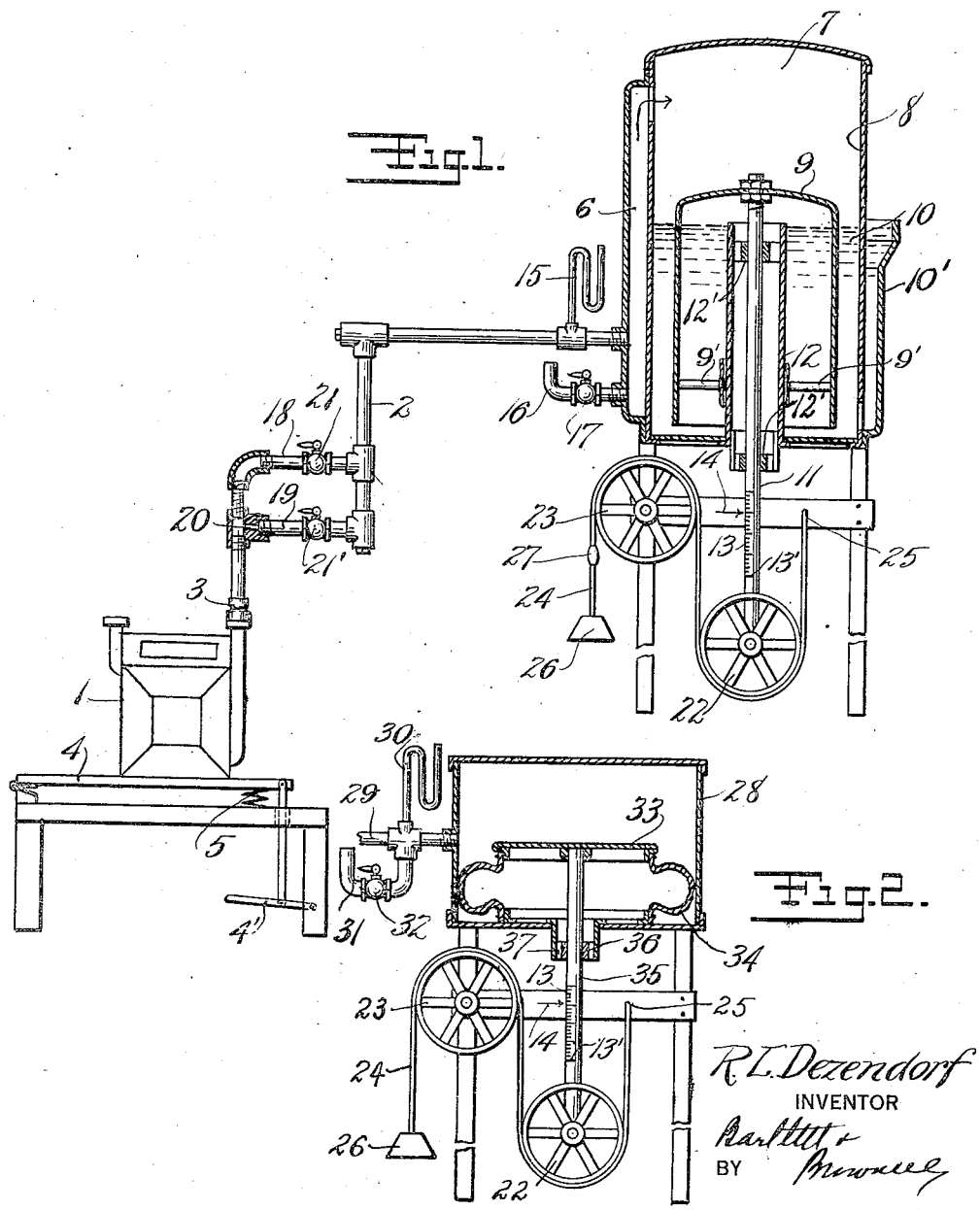

RICHARD L. DEZENDORF, OF RICHMOND HILL, NEW YORK.

MEANS FOR AND METHOD OF PROVING GAS METERS.

1,422,089. Specification of Letters Patent. Patented July 11, 1922.

Application filed March 22, 1919. Serial No. 284,455.

*To all whom it may concern:*

Be it known that I, RICHARD L. DEZENDORF, a citizen of the United States, residing at Richmond Hill, county of Queens, State of New York, have invented a certain new and useful Improvement in Means for and Methods of Proving Gas Meters, of which the following is a full, clear, and exact description.

My invention relates to improvements in means for and methods of testing or proving gas meters and has for its object the testing of gas meters by means of a partial vacuum and the suction produced thereby.

It further has for its object to provide for the testing of "open top" gas meters without closing the top thereof.

It further has for its object to provide a novel means for connecting the meter to the proving apparatus.

An "open top" gas meter is one in which the valves are exposed when the upper cover of the gas meter is removed, as distinguished from gas meters in which the valves are contained in a compartment which remains closed when such cover is removed. "Open top" gas meters have come into quite extensive use on account of their superior points. By the means and methods now employed for proving them it is necessary to close the top before proving. At the present time such open top gas meters when tested are provided with a temporary glass cover sealed by a rubber gasket or by putty or by some similar means, the air for proving being forced into the inlet of the gas meter. After each proving operation the temporary cover is removed and any necessary adjustment of the tangent is made, the temporary cover is replaced and the meter re-proved until the correct adjustment is attained. It is frequently necessary to repeat this operation several times before sufficient accuracy is attained. In practicing my invention the use of such temporary cover is unnecessary and there is a saving in time and labor. The invention therefore constitutes a valuable contribution to the art of proving gas meters.

The following is a description of an apparatus embodying my improved proving means and adapted to carry out my improved method, reference being had to the accompanying drawings, in which, Fig. 1 shows, partially in section, my improved apparatus, and Fig. 2 shows a modification of the same.

Referring more particularly to the drawings, 1 is the meter to be proved; 2 is a connection applied to the outlet port of said meter, the same having a yielding rubber head or tip 3. In connecting the meter the same is placed upon a table 4 hinged at one end and having its other end supported by springs 5. The meter is placed upon the table with its outlet port beneath the rubber tip 3, the table being depressed by the treadle 4'. When the table is released the springs 5 force the outlet port against the rubber tip so as to produce an air-tight joint. The connection 2 opens into a passage 6 leading to a chamber 7 in a container 8 of a gasometer having within it a bell diaphragm 9 whose lower end is sealed by a liquid seal 10, preferably of water introduced through the filling tube 10'. I prefer to make the bell of about twenty-four or twenty-six gauge metal. 11 is a means for lifting the diaphragm 9, which is preferably done manually, the same consisting of a rod fastened to the upper part of the bell diaphragm 9 and extending downward through a tubular extension 12, which forms a tight connection with the bottom of the container 8 and rises above the level of the water forming the liquid seal at all times. This tubular extension connects the interior of the bell with the atmosphere and constitutes a bearing for the guide 9' at the lower end of the bell. This extension carries guides 12' for the rod 11. The rod 11 is provided with a scale 13, which moves adjacent to a stationary index mark 14, so that the extent of movement of the diaphragm 9 is indicated upon said scale. The connection 2 is provided with a water pressure gauge 15 and the gasometer is provided with a vent 16 controlled by a valve 17, which, as shown, is in the form of a stop-cock. Between the gasometer and the outlet port are branch connections 18 and 19 controlled by stop-cocks 21 and 21'. The connection 18 is calibrated so as to have provided a large size passage, while the connection 19 is calibrated at 20 so as to provide a small size passage, the small size passage at 20 being sufficient to pass about 30 feet an hour when the pressure within the gasometer corresponds to a partial vacuum of about one and one-half inches of water in gauge 15.

Where the gasometer 8 and bell 9 are of large size for the testing of large meters, I find it advisable to actuate the lifting means 11 by a cord and pulley arrangement consisting of a pulley 22 carried by the rod 11, a pulley 23 carried by a stationary stanchion and a cable 24 having one end connected to the framework at 25 and passing around the pulleys 22 and 23. The free end of the cable 24 is provided with a weight 26, which partially counterbalances the diaphragm 9 and can be varied as desired. 27 is a handle attached to the cable 24 for the purpose of pulling downward the cable so as to lift the bell 9.

In the modification, Fig. 2, I have shown a dry gasometer, as distinguished from a wet gasometer, the same comprising container 28 forming a chamber. 29 is the connection leading from the chamber to the meter to be proved. 30 is the water gauge and 31 is the vent of said chamber controlled by the valve 32. In the lower portion of said container is a flexible diaphragm 33 having flexible sides 34 secured to the lower wall of the container. This defines the chamber in the container. To it is secured the actuating means 35 provided with a scale 13 adapted to move near the fixed index 14. The rod 35 plays in a guide 36. The lower side of the diaphragm 33 forming the chamber is open to the atmosphere through openings 37 in the container so that the lower surface of the diaphragm 33 is exposed to atmospheric pressure and said diaphragm is thereby kept expanded when there is a partial vacuum above it.

In both forms the weight of the diaphragm and connected parts constitutes means for causing the diaphragm to move outward relatively to the chamber of the gasometer.

In carrying out my method in connection with the apparatus above described as shown in Fig. 1, the outlet port of the meter is connected to the connection 2 in the manner described. The cock 17 is then opened and the bell diaphragm 9 raised by the rod 11, this being done either directly by hand, or, when the cable is used, through the cable 24. As the bell is thus raised, the air in the upper part of the gasometer is expelled through the vent 16. The bell should be raised until a starting mark 13' coincides with the index 14. After the bell has been so raised, the cock 17 is closed. The lifting means 11 is then released so that the bell 9 is free to fall. It falls under the action of gravity and as it falls produces a partial vacuum in the upper portion of the gasometer container, drawing air through the outlet port of the meter 1 into the chamber 7 in the upper part of the gasometer, the air passing through one of the connections 18 and 19, the other passage being closed by its cock. After the bell 9 has descended far enough to cause the meter tangent to make two revolutions an observation of the scale 13 is made and recorded. The bell 9 is again lifted and the operation repeated, the passage 18 or 19 previously open being closed by its cock and the other passage being opened. After the meter tangent has again made two revolutions, the reading of the scale 13 is again taken and recorded and the two readings are compared with what would be the correct reading for two revolutions of the meter tangent if the meter were in proper condition. If the meter is not shown to be in proper condition, the position of the tangent is changed and the operation repeated, the tangent being changed where necessary after each such two operations until it is shown that the registration of the meter is approximately correct whereupon the cover of the meter is placed in position and secured in place and the meter is ready to be sent out for use.

The modified form shown in Fig. 2 is actuated in a similar manner for carrying out the same method.

Inasmuch as the air used in proving the meter is drawn through the outlet of the meter, an open top meter does not require to have a temporary cover in place but the meter valves may be exposed to the atmosphere. While this invention is particularly valuable for use in connection with the testing of open top meters, it is equally applicable for the testing of closed top meters in which the valves are inclosed in a supplemental casing, the method of proving being carried out in the same manner as above described. The results accomplished by this means and method are remarkably accurate with both types of meter.

The two runs of the apparatus are called for because meters act differently under full load than under low load before proper adjustment and should be proved under both conditions. During each run a quantity of air is drawn through the outlet port of the meter and measured and compared with the indication of the meter. The cover being removed the movement of the tangent can be directly observed so that it is not necessary to observe the registering mechanism in order to attain accurate results.

By this apparatus and method meters can be proved accurately on two revolutions of the tangent for each run whereas heretofore it has been the practice to use six or more revolutions to get accurate results.

As will be evident to those skilled in the art, my invention permits of various modifications without departing from the spirit thereof or the scope of the appended claims.

What I claim is:

1. In a meter tester, the combination of a connection adapted to be applied to the outlet of a meter to be tested, means for producing and automatically maintaining a partial vacuum for drawing air through said connection, and means for determining the amount of air drawn through such connection during a given operation of said meter.

2. In a meter tester, the combination of a container closed at one end, a diaphragm forming a chamber in said end, a connection leading from said chamber and adapted to be applied to the outlet of a meter to be tested, a valved vent also connected to said chamber, means for moving said diaphragm inward relatively to said chamber to expel air therefrom, means for causing said diaphragm to move outward to produce a partial vacuum in said chamber, and means for indicating the extent of the outward movement of said diaphragm.

3. In a meter tester, the combination of a container closed at its upper end, a bell-shaped diaphragm forming a chamber in said end, a liquid seal for said bell-shaped diaphragm, a connection leading from said chamber and adapted to be applied to the outlet of a gas meter to be tested, a valved vent also connected to said chamber, and means for moving the said diaphragm upward in said chamber to expel the air therefrom and causing it to move downward to produce a partial vacuum therein, and means for indicating the extent of movement of said diaphragm.

4. The method of proving a meter which consists in producing and automatically maintaining a definite partial vacuum and thereby drawing a quantity of air through the outlet port of said meter, measuring the amount of air so drawn and comparing it with the indication of said meter.

5. The method of proving a meter which consists in producing and automatically maintaining a partial vacuum and thereby drawing one quantity of air from the outlet of said meter slowly through a small passage, measuring the amount of air so drawn, drawing another quantity of air from the outlet of said meter more rapidly through a large passage by a similar partial vacuum, and measuring the amount of air so drawn, and comparing the amounts of air so drawn with the corresponding indications of said meter.

6. In a meter tester, a gasometer comprising a container, a diaphragm located within said container and forming a chamber at one end thereof, said chamber having a port, a connection leading from said port, means for coupling said connection to the outlet port of a gas meter to be tested, a valved vent connected to said chamber, and means extending through an opening in the other end of said container for moving said diaphragm toward the closed end thereof to expel air therefrom and a gauge between said container and said coupling means.

7. In a meter tester, a gasometer comprising a container, an inverted bell diaphragm forming a chamber at one end thereof, said chamber having a port, a connection leading from said port, means for coupling said connection to the outlet port of a gas meter to be tested, a valved vent connected with said chamber, a tubular extension from said container projecting upwardly into said bell diaphragm, a liquid seal for said bell diaphragm, and means for moving said bell diaphragm extending downward from said diaphragm through said tubular extension and a gauge between said container and said coupling means.

RICHARD L. DEZENDORF.